United States Patent
Akimoto et al.

(10) Patent No.: US 7,197,075 B2
(45) Date of Patent: Mar. 27, 2007

(54) METHOD AND SYSTEM FOR VIDEO SEQUENCE REAL-TIME MOTION COMPENSATED TEMPORAL UPSAMPLING

(75) Inventors: Hiroshi Akimoto, 26, Kitayacho, Nakahara-ku, Kawasaki-shi, Kanagawa-ken, 211-0015 (JP); Sergey S. Kramer, 23-1 Tajiricho, Nakahara-Ku, Kawasaki-shi, Kanagawa-ken (JP) 211-0015

(73) Assignees: Hiroshi Akimoto, Kawasaki (JP); Sergey S. Kramer, Kawasaki (JP)

(*) Notice: Subject to any disclaimer, the term of this patent is extended or adjusted under 35 U.S.C. 154(b) by 756 days.

(21) Appl. No.: 10/646,635

(22) Filed: Aug. 21, 2003

(65) Prior Publication Data

US 2004/0091046 A1 May 13, 2004

Related U.S. Application Data

(60) Provisional application No. 60/405,414, filed on Aug. 22, 2002.

(51) Int. Cl.
*H04N 7/12* (2006.01)
*G06K 9/36* (2006.01)

(52) U.S. Cl. .................. 375/240.16; 382/236

(58) Field of Classification Search ........... 375/240.16, 375/240.29, 240.21, 240.27, 240.25; 348/452, 348/700, 459; 382/266, 236
See application file for complete search history.

(56) References Cited

U.S. PATENT DOCUMENTS 5,661,525 A * 8/1997 Kovacevic et al. ......... 348/452
6,181,382 B1 * 1/2001 Kieu et al. .................. 348/459
6,192,079 B1 * 2/2001 Sharma et al. ......... 375/240.16
6,317,165 B1   11/2001 Balram et al. .............. 348/699
6,317,460 B1   11/2001 Lee ........................ 375/240.16
6,377,621 B2    4/2002 Borer ........................ 375/240
6,385,245 B1    5/2002 De Haan et al. ........ 375/240.16
6,438,275 B1 *  8/2002 Martins et al. ............. 382/300
6,963,614 B2 * 11/2005 Hazra et al. ........... 375/240.25

OTHER PUBLICATIONS

T. Meier, K. N. Ngan, G. Crebbin, Reduction of Blocking Artifacts in Image and Video Coding IEEE Trans. on CSVT, 9(3):490-500, Apr. 1999.
A.M. Tourapis, O.C. Au, M.L. Liou, New Results on Zonal Based Motion Estimation Algorithms—Advanced Predictive Diamond Zonal Search, Department of Electrical and Electronic Engineering, The Hong Kong University of Science and Technology.
A.M. Tourapis, Hye-Yeon Cheon, Ming L. Liou, Oscar C. Au, Temporal Interpolation of Video Sequences Using Zonal Based Algorithms, Department of Electrical and Electronic Engineering, The Hong Kong University of Science and Technolgy.

* cited by examiner

*Primary Examiner*—Gims Philippe
(74) *Attorney, Agent, or Firm*—David L. Garrison; Garrison & Associates PS

(57) ABSTRACT

An improved method and system for motion-compensated temporal interpolation of video frames during video processing for computer video images, video games and other video effects where changes of an object's form or movement exist. One or more new intermediate video frames are generated and introduced in a processed video sequence in order to produce the appearance of more realistic motion of subjects. Information is obtained from existing video frames and an improved motion estimation algorithm, one that determines the true motion vectors of subject movement, is applied to re-create one or more missing frames. The addition of intermediate video frames further allows for an increase in the viewable frame rate and thereby provides improved frame-by-frame continuity of movement.

13 Claims, 10 Drawing Sheets

FIG.4
4a                           DARK SIDEBAND DETERMINATION
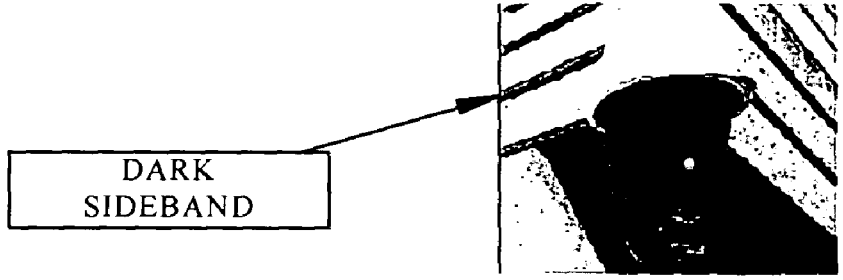
DARK SIDEBAND
THE 1st PICTURE OF "FOREMAN" VIDEO SEQUENCE
MAGNIFIED DARK SIDEBAND
4b
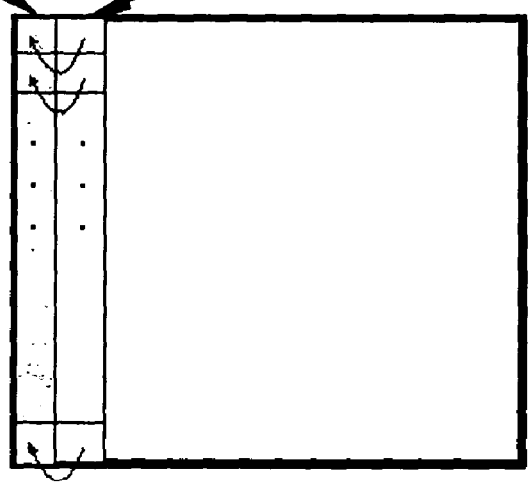
DARK SIDEBAND         DUPLICATED PIXEL FIG.6 A, C, D, G, H, K-ORIGINAL FRAMES FROM FOREMAN VIDEO SEQUENCE
B, E, F, I, J-INTERPOLATED FRAMES

FIG.7 TEMPORAL UPSAMPLING RESULTS FOR FOOTBALL VIDEO SEQUENCE

A AND C - ORIGINAL FRAMES FROM FOOTBALL VIDEO SEQUENCE

B - INTERPOLATED FRAME

BLOCK PASSING ORDER

FIG.10

BLOCK SEARCHING STRUCTURE

|   |   |   |   | 4 |   |   |   |   |
|---|---|---|---|---|---|---|---|---|
|   |   |   | 4 | 3 | 4 |   |   |   |
|   |   | 4 | 3 | 2 | 3 | 4 |   |   |
|   | 4 | 3 | 2 | 1 | 2 | 3 | 4 |   |
| 4 | 3 | 2 | 1 | 0 | 1 | 2 | 3 | 4 |
|   | 4 | 3 | 2 | 1 | 2 | 3 | 4 |   |
|   |   | 4 | 3 | 2 | 3 | 4 |   |   |
|   |   |   | 4 | 3 | 4 |   |   |   |
|   |   |   |   | 4 |   |   |   |   |

FIGURES 1, 2, 3, 4 ARE NUMBERS OF SEARCH ZONES

METHOD AND SYSTEM FOR VIDEO SEQUENCE REAL-TIME MOTION COMPENSATED TEMPORAL UPSAMPLING

CROSS-REFERENCE TO RELATED APPLICATION

This application claims benefit of U.S. Provisional Application Ser. No. 60/405,414 entitled Method and System for Video Sequence Real-Time Motion Compensated Temporal Upsampling, filed Aug. 22, 2002.

FIELD OF INVENTION

The invention relates to an improved method and system for video processing. In particular, this invention describes a method and system for motion-compensated temporal interpolation of video frames in processing video sequences such as computer video images, video games and other video effects where changes of an object's form or movement exist.

BACKGROUND OF THE INVENTION

This invention relates to encoding and decoding of complex video image information including motion components that may be found in multi-media applications such as video-conferencing, video-phone, and video games. In order to be able to transfer complex video information from one machine to another, it is often desirable or even necessary to employ video compression techniques. One significant approach to achieving a high compression ratio is to remove the temporal and spatial redundancy which is present in a video sequence. To remove spatial redundancy, an image can be divided into disjoint blocks of equal size. These blocks are then subjected to a transformation (e.g., Discrete Cosine Transformation or DCT), which de-correlates the data so that it is represented as discrete frequency components.

Motion film and video provide a sequence of still pictures that creates the visual illusion of moving images. Providing that the pictures are acquired and displayed in an appropriate manner, the illusion can be very convincing. In modem television systems it is often necessary to process picture sequences from film or television cameras. Processing that changes the picture rate reveals the illusory nature of television. A typical example is the conversion between European and American television standards which have picture rates of 50 and 60 Hz respectively. Conversion between these standards requires the interpolation of new pictures intermediate in time between the input pictures. Many texts on signal processing described the interpolation of intermediate samples, for a properly sampled signal using linear filtering. Unfortunately, linear filtering techniques applied to television standards conversion may fail to work. Fast moving images can result in blurring or multiple images when television standards are converted using linear filtering because video signals are under-sampled.

The benefits of motion compensation as a way of overcoming the problems of processing moving images are widely recognized in the prior art. Motion compensation attempts to process moving images in the same way as the human visual system. The human visual system is able to move the eyes to track moving objects, thereby keeping their image stationary on the retina. Motion compensation in video image processing attempts to work in the same way. Corresponding points on moving objects are treated as stationary thus avoiding the problems of under sampling. In order to do this, an assumption is made that the image consists of linearly moving rigid objects (sometimes slightly less restrictive assumptions can be made). In order to apply motion-compensated processing it is necessary to track the motion of the moving objects in an image. Many techniques are available to estimate the motion present in image sequences.

Motion compensation has been demonstrated to provide improvement in the quality of processed pictures. The artifacts of standard conversion using linear filtering, i.e., blurring and multiple-imaging, can be completely eliminated. Motion compensation, however, can only work when the underlying assumptions of a given subject are valid. If a subject image does not consist of linearly moving rigid objects, the motion estimation and compensation system is unable to reliably track motion resulting in random motion vectors. When a motion estimation system fails, the processed pictures can contain subjectively objectionable switching artifacts. Such artifacts can be significantly worse than the linear standards conversion artifacts which motion compensation is intended to avoid.

Motion vectors are used in a broad range of video signal applications, such as coding, noise reduction, and scan rate or frame-rate conversion. Some of these applications, particularly frame rate conversion, requires estimation of the "true-motion" of the objects within a video sequence. Several algorithms have been previously proposed to achieve true-motion estimation. Algorithms have also been proposed that seek to provide motion estimation at a low complexity level. Pel-recursive algorithms that generally provide sub-pixel accuracy, and a number of block-matching algorithms have been reported that yield highly accurate motion vectors.

SUMMARY OF THE INVENTION

The present invention provides a video signal processing method and system for reconstruction of a previously compressed video sequence by creation and insertion of supplementary video frames into an upsampled video sequence. Movement characteristics of an object within a video frame are evaluated and used to estimate the object's position in the supplementary video frames.

Motion vectors are determined for object motion within video frames using the object's position information from the two neighboring frames, which are then used for the filling in new frames. After the creation of the new frame, a border is re-established along the edge of the frame.

The present invention additionally provides a means of removal of the dark bands present along the edges of video frames by extrapolating a video frame—inserting blocks of video information beyond the borders of the real frame. This broadening of frames beyond the original frame borders also provides for better interpolation of new frames.

BRIEF DESCRIPTION OF THE DRAWINGS

FIG. 4(*a*) shows an example of a dark band along the edge of a video frame.

FIG. 4(*b*) illustrates the filling in of the dark band along the edge of a video frame with pixels from within the frame.

FIG. 10 shows the structure of a block search within a video frame.

DETAILED DESCRIPTION OF THE INVENTION

The following definitions apply to the present invention:

Temporal interpolation: a process of generation and insertion of one or more video frames into a source video sequence.

Interpolated frame: a video frame generated by the present invention method that is inserted between the existing frames of a video sequence.

Object motion: the change in location of an object over the course of a video sequence.

Object deformation: the change in form of an object over the course of a video sequence.

Motion vector: the difference between the coordinates of the block in the preceding frame and the coordinates of the corresponding block found in the next frame.

Motion estimation: the process of locating motion vectors for all blocks in the preceding frame.

Figure 1:
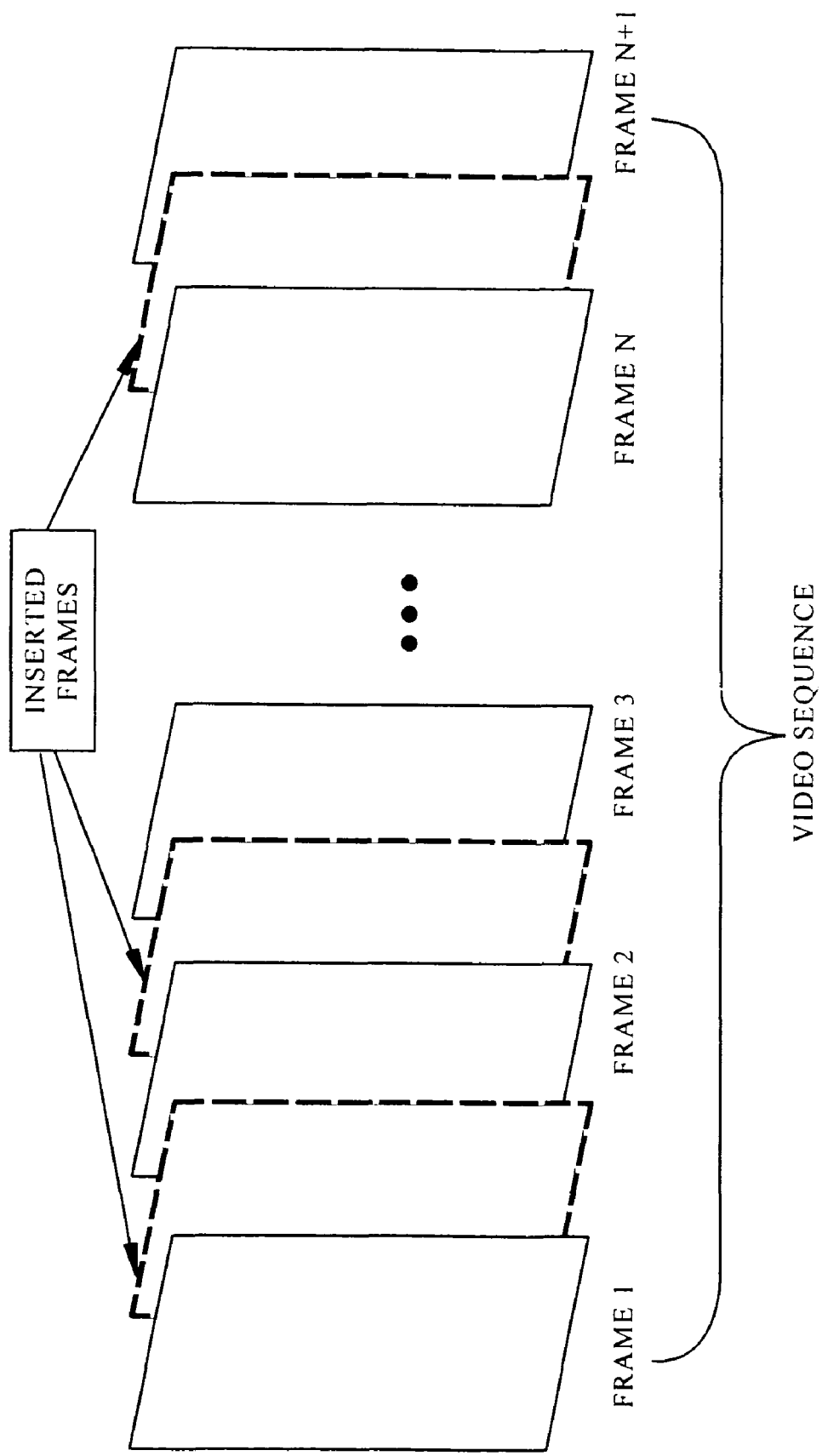
FIG. 1 illustrates the insertion of additional frames into the video sequence.
Figure 2:
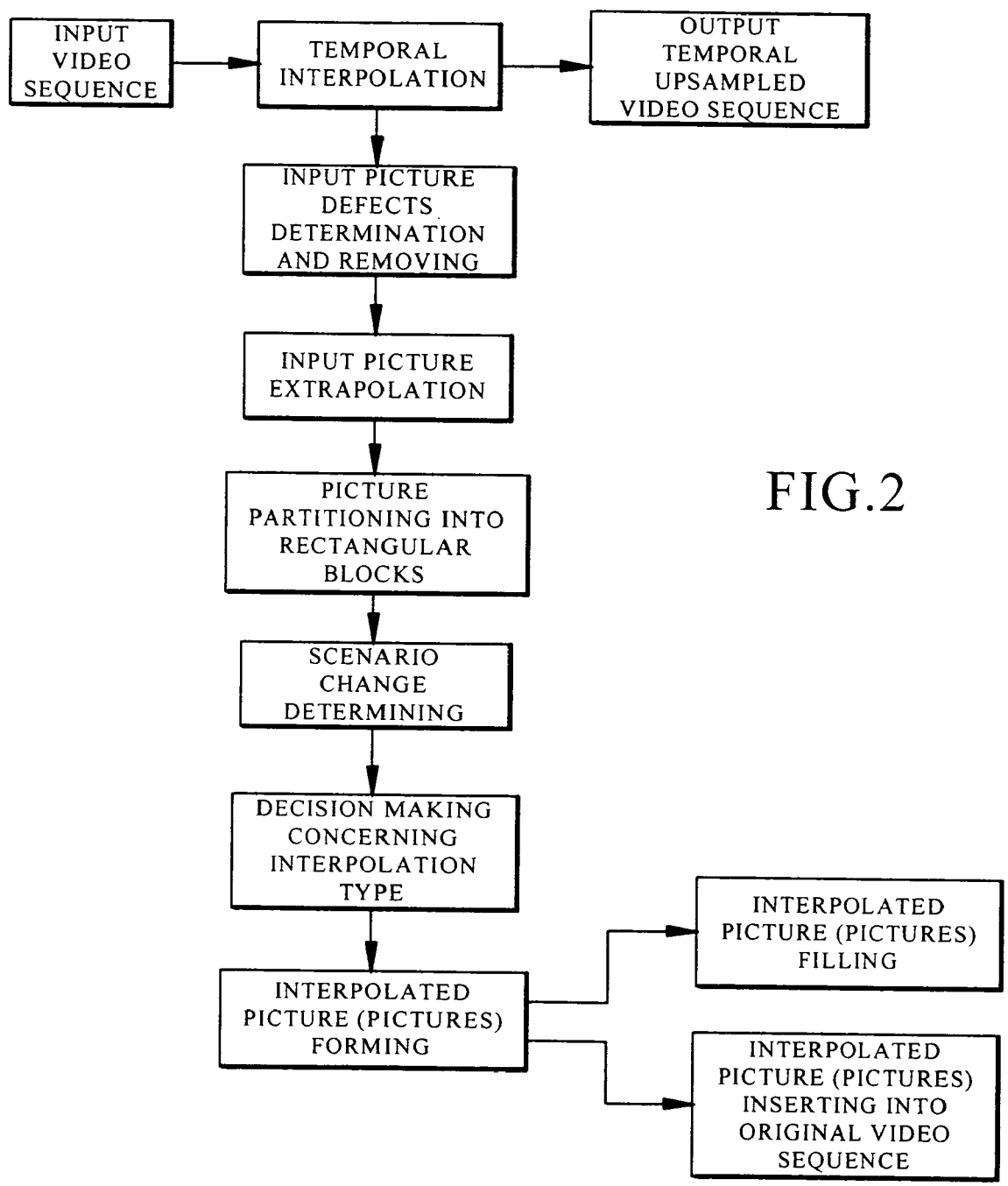
FIG. 2 is a block diagram representation of the operation of the temporal interpolation algorithm on a video sequence.
Figure 3:
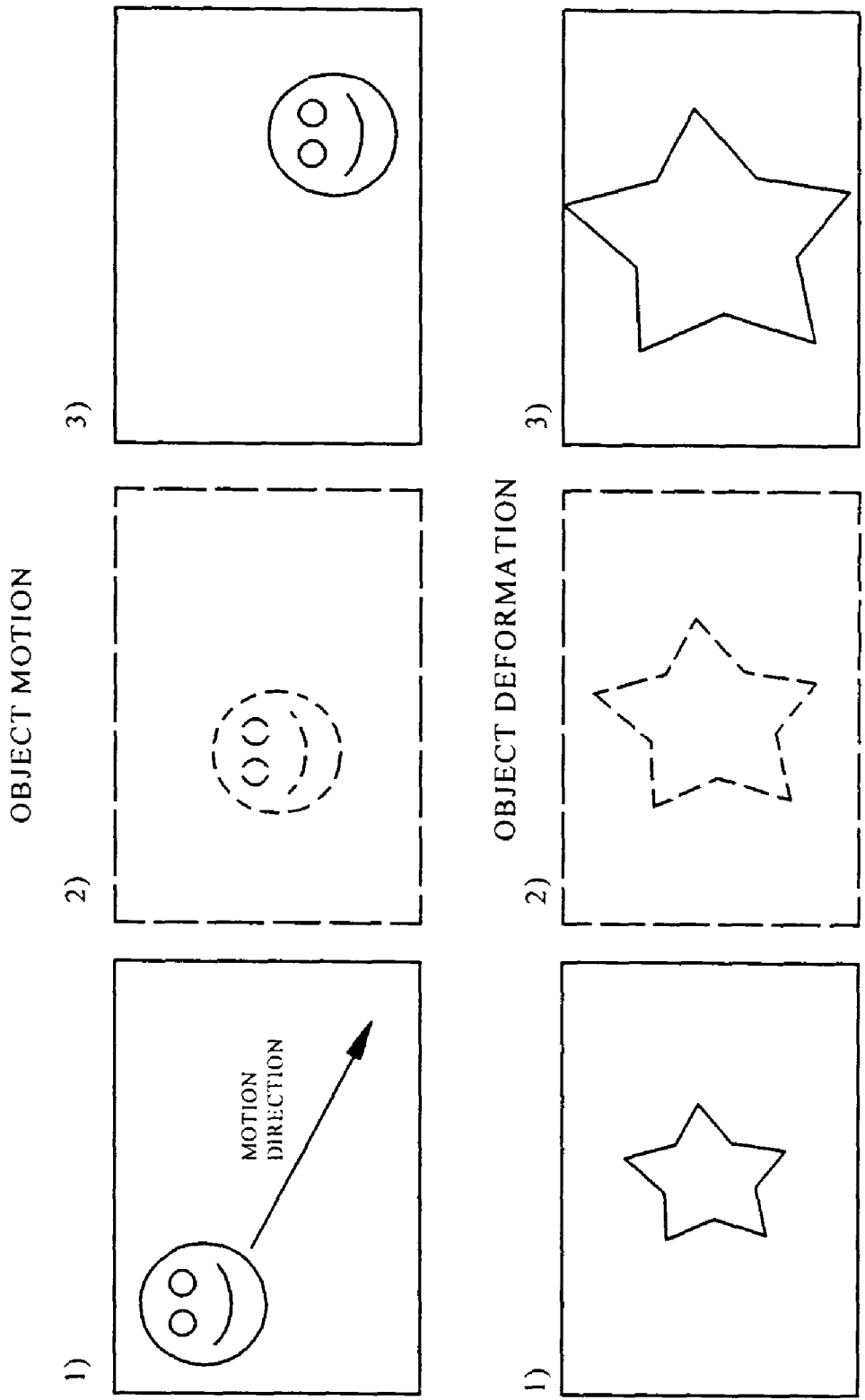
FIG. 3 illustrates a example of the movement of an object in a video film.

Adjacent frames: sequential video frames with the numbers N and N+1 in a video sequence, as shown in FIG. 1.

Fps: the number of frames per second for a video sequence. The present invention permits a variation of the value of fps by a whole number for the source video sequence.

Extrapolation: the broadening of a video frame beyond its original borders by a specified number of pixels.

Application of the present invention algorithm creates an arbitrary number of frames between two adjacent frames of a video sequence. Depending on the dynamic of the subject of a video sequence, the need may arise for the insertion of one frame or more video frames between two adjacent frames. The insertion of frames helps to produce smoothness of the movements of objects in the video film. There are different types of dynamics for development of the subject of a video sequence. In drawings 6 and 7, frames from the video sequences "Foreman" and "Football" are provided as examples of video sequences with a high dynamic of subject development; the objects exhibit a high degree of movement for several frames, and a significant change of scene or subject takes place.

Figure 6:
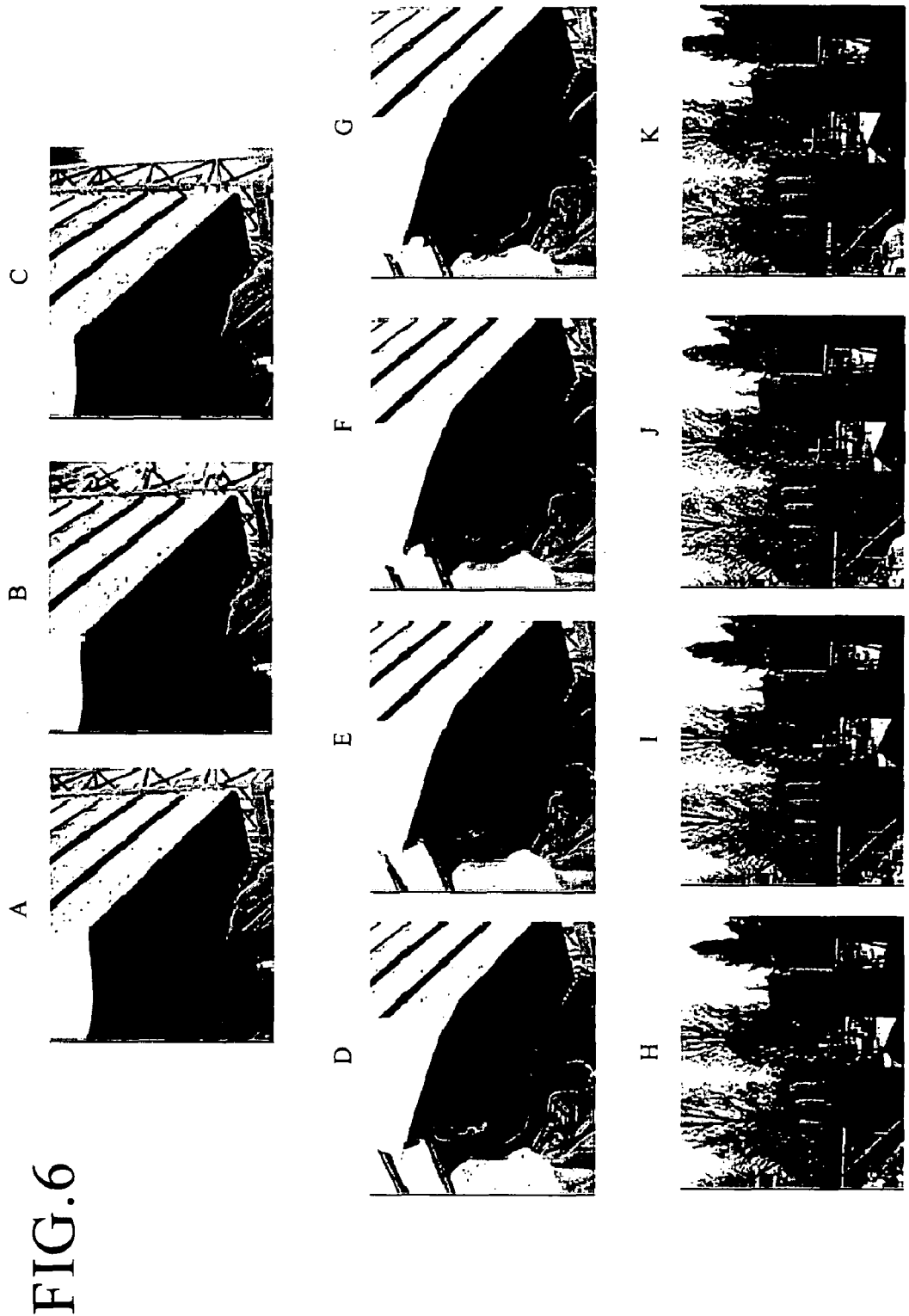
FIG. 6 illustrates the application of the present invention on an example of frames from a "Foreman" video sequence.

FIG. 6 shows the addition of several video frames between adjacent frames in the "Foreman" video sequence. Interpolated frames E and F were inserted between original frames D and G in order to smooth the transition from one scene to another and to make the movements of the subject more realistic.

Figure 7:
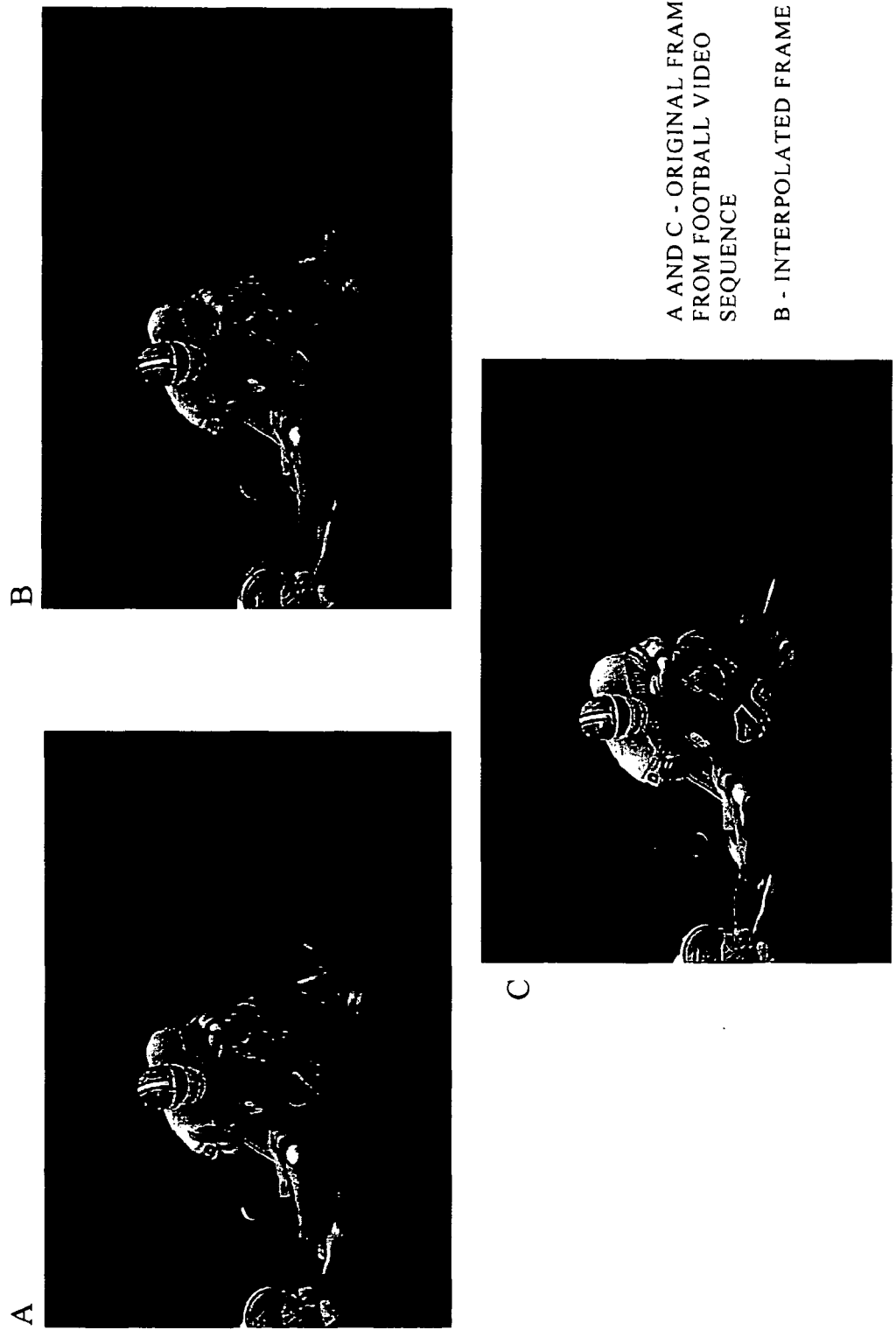
FIG. 7 illustrates the application of the present invention on an example of frames from a "Football" video sequence.

Video frames from the "Football" video sequence shown in FIG. 7 presents a somewhat different situation. There is also rapid movement of objects here, but the background scene does not change. A video frame is added in this case in order to make the movement of the objects (the falling of football players with a ball) more natural.

Figure 5:
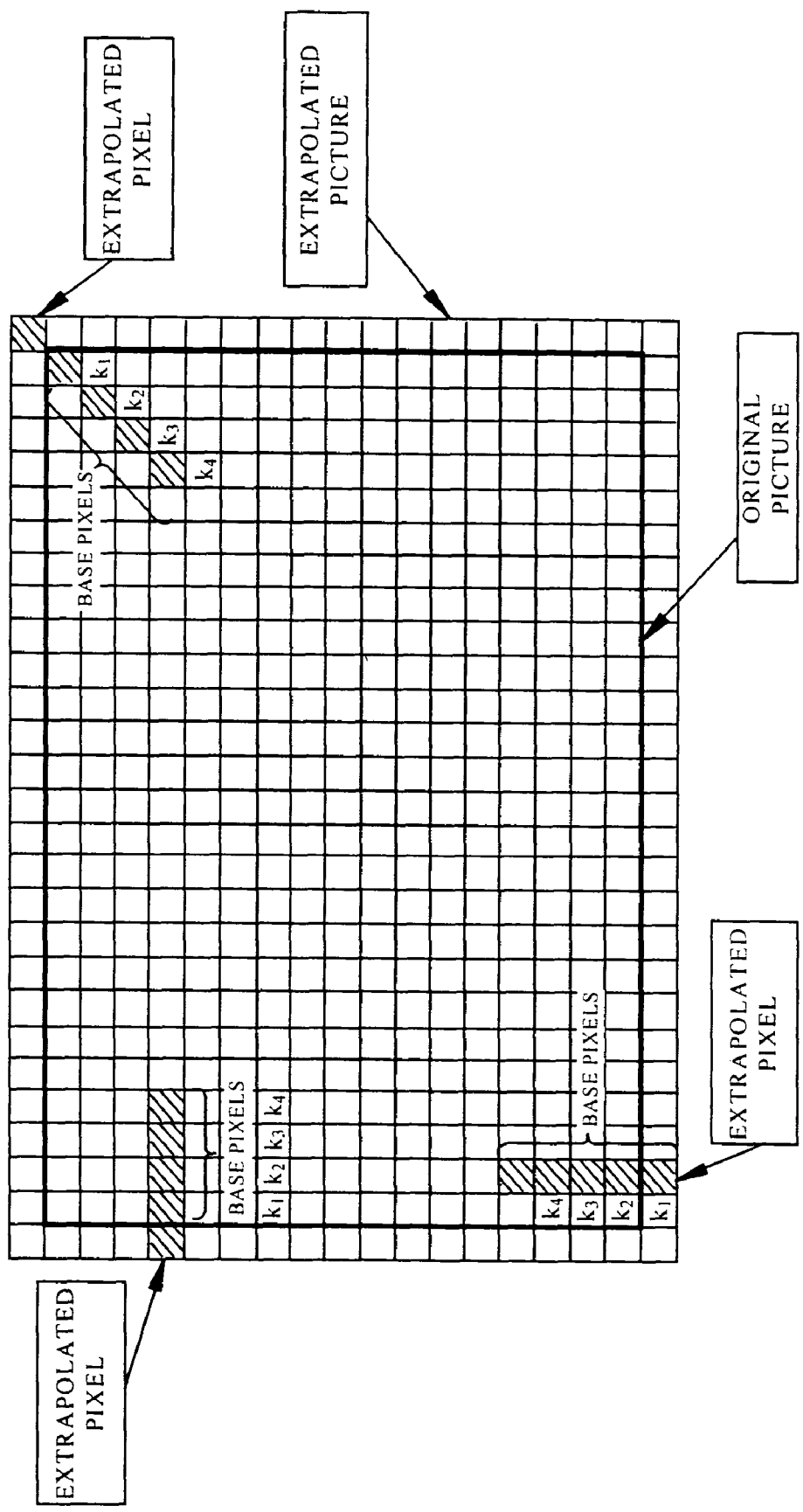
FIG. 5 illustrates an extrapolation of a video frame beyond its original borders.

The algorithm provides a means for:
1. Reading two adjacent video frames in a sequence.
2. Identifying and storing the dark band along the edge of the frame (if present), and removing the band from the frame as illustrated in FIG. 4(b).
3. Expanding each video frame beyond its original borders by 8 pixels from each side of the frame, as shown in FIG. 5, applying the following extrapolation procedure.
4. Splitting the next video frame into quadratic blocks, and finding the corresponding block within the previous frame in order to obtain a displacement vector for each block.
5. Decreasing the length of the displacement vector by k/n times, where n is the coefficient for increasing fps, and 0<k<n is a number relative to the previously inserted frame.
6. Determining the presence of a scene change.
7. If there was no scene change, then the interpolated frame is filled using the calculated movement vectors.
8. If there was a scene change, then the pixels of the interpolating frame are filled using values for the type of interpolation applied.
9. Restoring the dark band along the edges of each video frame if a dark band was originally present.
10. Creating the interpolated video frame and inserting it into the upsampled video sequence as the video output.

In some video sequences there is a dark band along the edges of the video frames as illustrated in FIGS. 4(a) and 4(b). The following is a description of the procedure for detection and removal of defects (dark bands) along the edges of a video frame.

The dark band consist of bands which we perceive as black and bands, the brightness of which differs significantly from the brightness of the primary part of the frame. The average brightness value of the black band in the YUV color system does not exceed 20, and the brightness differential for the darkened band is not less than 35. The difference between the average brightness of the dark band and the average brightness of the subsequent band of pixels, as a rule, is more than 35. It is necessary to remove these bands in order to allow extrapolation of a video frame beyond its original borders.

The algorithm for detection and removal of video frame defects (dark bands) along the edges of the frame provides the following steps:
1. Calculating the average brightness values for m bands of a width of 1 pixel.

$$\text{Average}Y(x) = \left(\sum_{y=0}^{height-1} Y(x, y)\right) \bigg/ height$$

for vertical bands $$\text{Average}Y(y) = \left(\sum_{x=0}^{width-1} Y(x, y)\right) \bigg/ width$$

for horizontal bands.

2. A band is considered dark if the following conditions are fulfilled: if $$\text{Average}Y[i] < 20$$

or (AverageY[i+1]−AverageY[i])>35.

3. The brightness values for pixels of a dark band are replaced by values for the pixels from the first non-dark band encountered, as shown in FIG. 4(b).

An extrapolation algorithm is applied for predicting the brightness of pixels outside the borders of a frame of a video image following the procedure for removal of the dark band (if present.) An extrapolation a filter of length 4 is used.

| | Input data: |
|---|---|
| Image | Input image (frame) |
| Height | Frame height |
| Width | Frame width |
| Number_of_points | Number of interpolation points |
| $I_1, I_2, I_3, I_4$ | Reference points |
| $k_1, k_2, k_3, k_4$ | Filter coefficients |
| $I_1$ | Extrapolated point |
| | Output data: |
| Extrapolated_Image | Extrapolated image |

The extrapolation algorithm performs the following steps:
1. The image is transformed into YUV video format, and the algorithm is applied to each layer.
2. Four reference points are established for the filter. New reference points are then determined in relationship to these four points.
3. If the base points $I_1, I_2, I_3, I_4$ are established, then $I_0$ is a point that will be extrapolated.
4. Let $k_1, k_2, k_3, k_4$ be the filter coefficients. The corresponding extrapolated point is then calculated by the following method:

$$I_0 = \frac{\sum_{i=1}^{4} I_i * k_i}{\sum_{i=1}^{4} k_i}.$$

5. Selection of an appropriate filter coefficient for use in the algorithm is critical. The largest coefficient $k_1$ is selected, and is increased to the brightness value of the outermost pixel of the frame, as shown in FIG. 5.

Broadening blocks within a video frame requires selection of the most appropriate ("best") block for the given video frame. It is important to apply a metric that allows the detection a compatibility of blocks and that does not require the use of vast computer resources. The following metric is used in the present invention:

SAD=SAD($Y_{x_0,y_0}$, $\hat{Y}_{x_1,y_1}$,block_size_x,block_size_y)+4·SAD($U_{x_0/2,y_0/2}$, $\hat{U}_{x_1/2,y_1/2}$,block_size_x/2, block_size_y/2)+4·SAD($V_{x_0/2,y_0/2}$, $\hat{V}_{x_1/2,y_1/2}$,block_size_x/2,block_size_y/2)

where $$SAD(I_{x_0,y_0}, I_{x_1,y_1}, block\_size\_x, block\_size\_y) = \sum_{i=0}^{block\_size\_x} \sum_{i=0}^{block\_size\_y} |I_{x_0+i,y_0+j} - \hat{I}_{x_1+i,y_1+j}|$$

where $I_{x_0,y_0}$ and $\hat{I}_{x_1,y_1}$ are comparable blocks from frames I and Î.

The coordinates for the blocks are $(x_0, y_0)$ and $(x_1, y_1)$, respectively. The given coordinates are coordinates for the left upper corner of the block.

block_size_x and block_size_y—are the measurements of the blocks.

Y-luminance, U, V-chrominance.

The following describes the procedure for splitting the frame into quadratic blocks. Prior to execution of the search, the next frame is covered with non-overlapping quadratic blocks of size N×N, where N is selected depending on the size of the frame:

| Frame format | Frame size in pixels (Height) | N |
|---|---|---|
| QCIF | 144 | 4 |
| SIF | 240 | 8 |
| BT | 480 | 16 |
| R601 | 480 | 16 |

Figure 8:
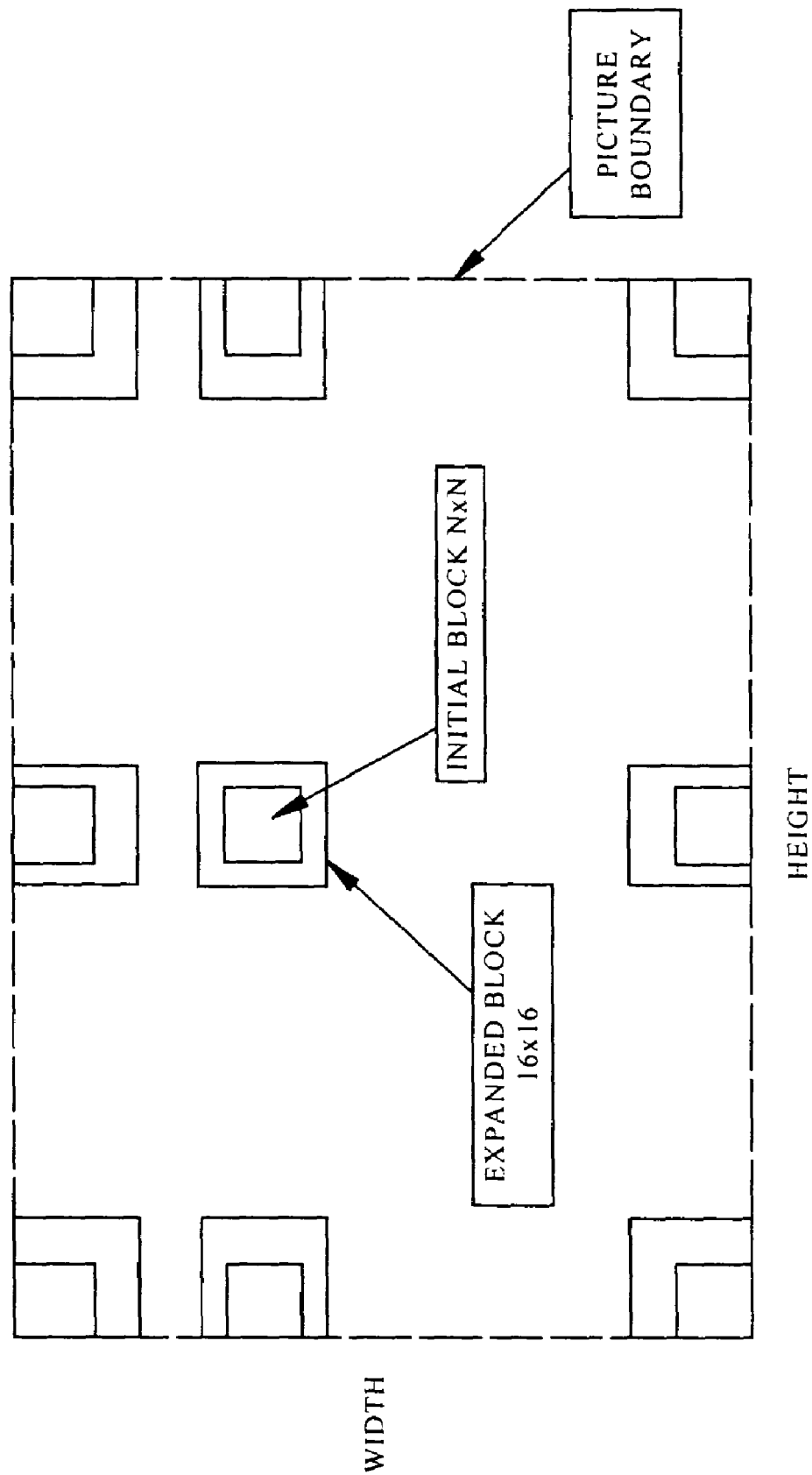
FIG. 8 illustrates details of the broadening of blocks in a frame.

During a search of the vectors a comparison is conducted for 16×16 blocks obtained from N×N blocks by means of adding to them a layer of surrounding pixels, as shown in FIG. 8. Depending on the frame sizes the following conditions are developed:

N=4;
if (height>200)
{N=8} if (height>400); and
{N=16}

Both frame height and width are verified. Thus, depending on the format of the source video sequence, system parameters are automatically adjusted.

Calculation of the coordinates of the lower left corner of a 16×16 block is provided as follows:

Input Data:

| | Input data: |
|---|---|
| x, y | Coordinates for the lower left corner of a N × N block |
| $x_1, y_2$ | Coordinates for the lower left corner of a 16 × 16 block |
| width | Frame width |
| height | Frame height |

The algorithm for calculation of the coordinates of the lower left corner of a 16×16 block:
1. $x_1 = x − (16−N)/2$;
2. $y_1 = y − (16−N)/2$;

Verification is made of the following conditions:
if $x_1 < 0 \Rightarrow x_1 = x$;
if $y_1 < 0 \Rightarrow y_1 = y$;
if $x_1 + (16−N) > width − 1 \Rightarrow x_1 = x − (16−N)$;
if $y_1 + (16−N) > height − 1 \Rightarrow y_1 = y − (16−N)$;
where x, y are coordinates for block N×N;
where $x_1, y_2$ are coordinates for block 16×16;
width—frame width;
height—frame height.

The following sequence for searching blocks for displacement vectors has been found to be optimal.

Figure 9:
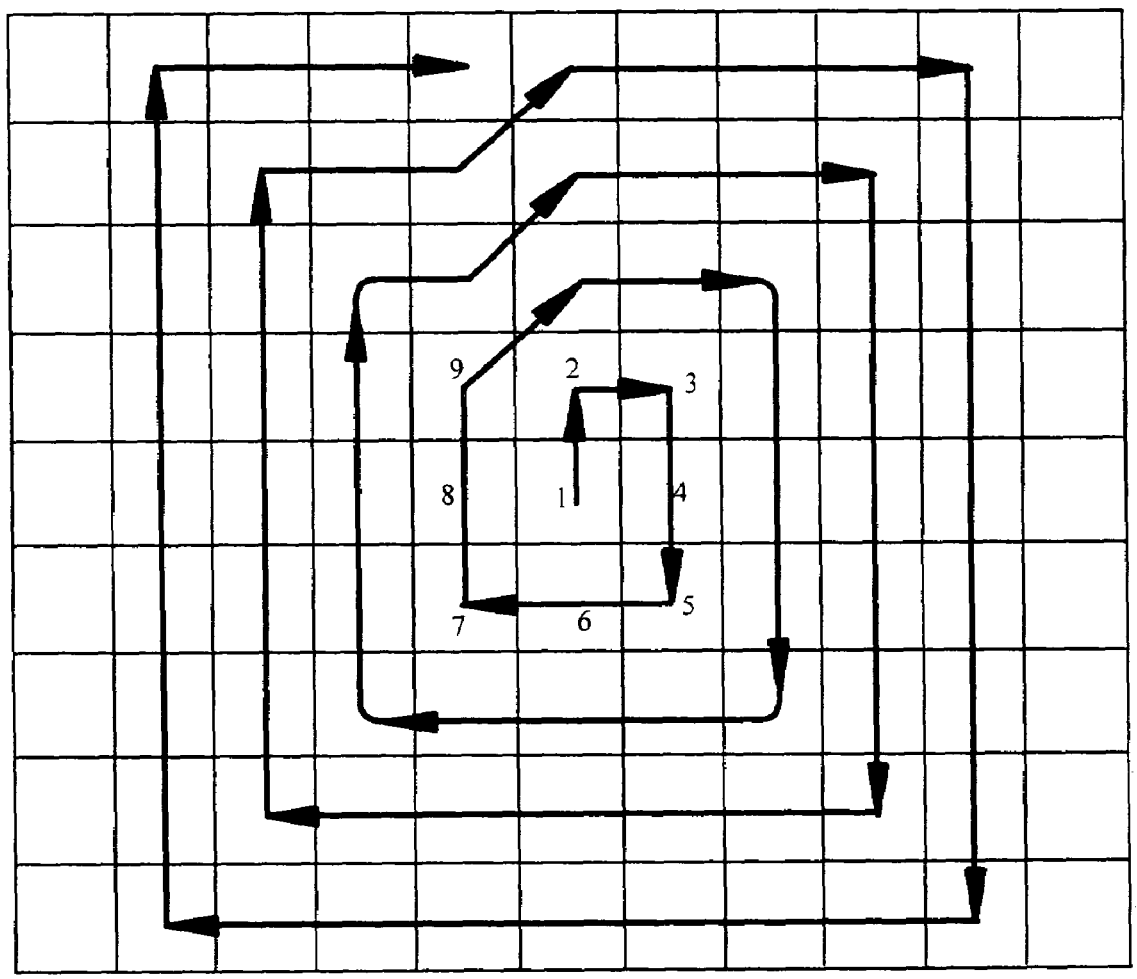
FIG. 9 shows the order of passing of blocks within a video frame.

1. Beginning with a central block, an outward-spiraling by-pass of the blocks is made, as illustrated in FIG. 9.

2. The displacement vector for the remaining blocks is then calculated.

An adaptive accelerated search for the displacement vectors of blocks is applied separately for each block:

The algorithm for the search procedure is intended to search zones, use a vector-predictor from adjacent blocks and the preceding frame, establishing criteria for a falf-pause, and provide adaptive selection of threshholds.

An aggregate of thresholds (T1, T2, T3) is used to control the course of the search operation as follows:

| Threshold | Threshold designation |
|---|---|
| T1 | Determines the continuation or completion of the search |
| T2 | Determines if the number of subsequent examined/verified search zones is limited |
| T3 | Determines the completion of the search according to the half-pause criterion |

The following variables are also applied to the search operation:

| | |
|---|---|
| zsize | The parameter for the half-pause criterion, gives the maximum number of search zones during the scanning of which a mistake in a located vector may not be corrected; |
| znum | The maximum number of search zones around the selected center (0, 0); |
| pznum | The maximum number of search zones around the main vector-predictor (median); |
| MinZone | The current number of zones in which a vector was found with minimal error; |
| Found | An indication of the fact that all vector-predictors are equal to each other, different from (0, 0), and correspond to the vector of the block positioned in the previous frame in the current position; |
| Last | An indicator of the final iteration; |
| MinSAD | The current located minimal error; |

The following are the initial values for the thresholds T1, T2 and T3 and the associated variables described above:

| T1 | T2 | T3 | zsize | znum | pznum | MinZone | Found | Last |
|---|---|---|---|---|---|---|---|---|
| 4 * 256 | 6 * 256 | 14 * 256 | 3 | 4 | 4 | 0 | false | false |

The following are the algorithm steps for the search procedure:

Step 1

Building a rhomboid-shaped structure containing a selected number of search zones, as shown in FIG. 10.

Step 2

Selecting and storing adjacent blocks for the processed block, in which displacement vectors have already been found are selected and stored. The selected blocks are sorted according to the increment of errors (SAD). Blocks in which there is an error twice as large as the smallest error are eliminated. An aggregate of predictors for the search is thus created—aggregate A containing the vectors for these blocks.

Step 3

Calculating the threshold values. Threshold T1 is selected as the minimum from the error values (SAD) for the adjacent blocks, selected in step 2, and the error values for the block from the preceding frame in the current position of the splitting array. T2=T1+the dimension of the block in pixels. The algorithm parameters are thus initialized.

Step 4

Calculating the median of the vectors for the x and y coordinates for the selected adjacent blocks. If the values of all vectors in the aggregate of predictors A:

1) coincide and are different from (0,i) and (i,0), where i is a whole number; and
2) coincide with the value of the median, then the search will be conducted only in the first zone (pznum=1) and the "Found" character is specified. If only one of these conditions is fulfilled, then the search will be conducted only in the first two zones (pznum=2). The predictor forecasts the character of the movement in the given place in the interpolated frame. Due to the determination of the predictor, the system is adjusted to accommodate the determined character of movement in the given adjacent frames of the video sequence, used for the interpolation of new frames.

Step 5

Calculating the error (SAD) for the main predictor. If the main predictor coincides with the vector of the block positioned in the preceding frame in the same position as the main predictor, but in this case the predictor error (SAD) is less than the error for the indicated vector, or the error according to the value is less than the dimensions of the block, then skipping to the final step.

Step 6

Calculating the error (SAD) for all vectors in the aggregate A, and selecting with the current value the vector with the minimal error MinSAD.

Step 7

Verifying the condition MinSAD<T1. If the condition is satisfied, the process skips to the final step. If the current vector coincides with the vector for the block located in the previous frame in the same position, but the current minimal error in this case is less, the process also skips to the final step.

Step 8

If T1<Min SAD<T2, then we in fact establish the character "Last".

Step 9

Constructing a given number of zones around the main predictor. Then, in the subsequent steps, processing in sequence each of the constructed zones beginning from the center.

Step 10

Calculating the error (SAD) for all points from each of the zones.

Step 11

Verifying that the result was improved within the framework of the given number of the nearest already-processed zones zsize. If the improvements were made previously (the current zone—MinZone>size), and MinSAD<T3, then the process skips to the final step.

Step 12

If there is no minimal error value in the second search zone, and MinSAD<T3, then the process skips to the final step.

Step 13

If MinSAD<T1 or in fact is the character "Last", then the process skips to the final step.

Step 14

Returning to step 8 as often as required.

Step 15

Shifting to processing the next furthest from the center zone, and processing to step 10.

Step 16

Steps 9 to 15 are repeated, but this time the center zone moves to the point (0,0).

Step 17

Steps 9 to 14 are repeated, but this time the center zone moves to the point, the coordinates of which are given by the best vector found up to that moment.

Step 18

Obtaining the optimal vector of movement for the given block, having a minimal error MinSAD.

Description of the procedure for calculating the values of pixels with non-integer coordinates.

The given procedure is carried out in the event that the block has a displacement vector with non-integer coordinates, that is it is displaced by a fractional number of pixels. Thus, the necessity for calculation of the values of the intermediate pixels for blocks located in the original adjacent frames of the video sequence arises. The values of the intermediate pixels are calculated with the help of a bilinear interpolation formula:

$$I(x+dx, y+dy)=I(x, y)\cdot(1-dx)\cdot(1-dy)+I(x+1, y)\cdot dx\cdot(1-dy)+I(x, y+1)\cdot(1-dx)\cdot dy+$$

$I(x+1, y+1)\cdot dx\cdot dy$;

Where $I(x, y)$—is the value of the pixel, x, y—are the coordinates of the pixel.

The obtained result is rounded up to the nearest whole number.

The following are the algorithm steps for filling an interpolated frame on the basis of the calculated vectors of movement.

1. Superimposing on an interpolating frame the same array N×N as in the subsequent frame.
2. For each block, applying the displacement vector obtained from the adaptive accelerated search procedure.

Filling in the image pixels with the following values:

$$I\_interp(x, y, vx, vy, k, n)=((n-k)\cdot I\_{prev}(x+k\cdot vx/n, y+k\cdot vy/n)+k\cdot I\_next(x-(n-k)\cdot vx/n, y-(n-k)\cdot vy/n))/n,$$ where n is the coefficient for increasing fps;

0<k<n is the number relative to the preceding, inserted frame;

I_interp are the points of the interpolated frame;

I_prev—are the points of the preceding frame;

I_next—are the points of the subsequent frame;

x,y—are the coordinates for the pixel in the interpolated frame;

vx, vy—are the coordinates for the displacement vector, as determined by the adaptive accelerated search procedure.

Applying a bilinear interpolation for points with a fractional vector of displacement.

A video sequence can be seen as an aggregate of scenes. A scene is a part of a video sequence in which it is possible to form each subsequent frame on the basis of the previous frame with the assistance of a motion estimation procedure. If the presence of a change of scene is detected, then either the preceding or subsequent frame is duplicated.

The following algorithm variables are used for determining the presence of a scene change:

| | |
|---|---|
| cnt_bad_blk | The number of vectors with an error less than some threshold |
| block_cnt | The number of blocks into which the frame is split |
| err[i] | The error for the I block |
| scale | The coefficient for increasing fps |
| pos | The number for the inserted frame relative to the preceding frame, with which the reference is begun with zero. |

The following is the algorithm steps are used for determining the presence of a scene change:

```
int cnt_bad_blk=0;
    for (int i=0; i<block_cnt;i++)
    {
        if(err[i]>15*256[i])
        {
            cnt_bad_blk++;
        }
    }
``` bool scene_is_changed=(cnt_bad_blk>0.7*block_cnt);

If the variable scene_is_changed has a positive value, then a change of scene is considered to have taken place. Either the preceding or the subsequent frame is then inserted as the interpolating frame, and is followed by the following:

```
if(scene_is_changed)
{
    if(pos<scale/2)
    {
    the preceding frame is inserted
    }
    else
    {
    the subsequent frame is inserted
    }
}
```

A decision must be made as to the type of interpolation for a given segment of the video sequence. An interpolation type is implemented using motion vectors (motion compensated interpolation), or a pixel by pixel interpolation.

Pixel-by-pixel interpolation is carried out using the following formula:

$$I\_{interp}(x, y, k, n)=((n-k)\cdot I\_{prev}(x, y)+k\cdot I\_{next}(x, y))/n$$

where I_interp is the value of the interpolating pixel;

I_prev—is the value of the pixel in the preceding frame;

I_next—is the value of the pixel in the next frame;

x, y—are the pixel coordinates;

n—is the coefficient for increasing fps;

k—is the number relating to the preceding, inserted frame, 0<k<n.

The following variables are used in the algorithm for determining the presence of a scene change:

| | |
|---|---|
| cnt | The number of vectors with an error less than some threshold |
| average_v_x, average_v_y | Coordinates of the average vector |
| block_cnt | The number of blocks into which a frame is split |
| vx[i], vy[i] | Coordinates of the displacement vector for block i. |
| err[i] | The error for block i |
| max_v_x | The maximum value for the x-components of a vector with an error greater than some threshold |
| max_v_y | The maximum value for the y-components of a vector with an error greater than some threshold |
| maxv | The larger of the two values max_v_x and max_v_y |

The average vector is calculated using the following algorithm:

```
cnt=0
average_v_x=0
average_v_y=0
for (int i=0; i<block_cnt; i++)
{
  if(err[i]<15* 256[i])
  {
    average_v_x+=vx[i];
    average_v_y+=vy[i];
    cnt++;
  }
}
average_v·x/=cnt;
average_v·y/=cnt;
```

The following algorithm is used to determine the type of interpolation to be applied:

```
max_v_y=0
for (int i=0; i<block_cnt;i++)
{
  if(err[i]<15*256[i])
  {
    cnt++;
  }
  if(err[i]>15* 256[i])
  {
    if(abs(vy[i])>max_v_y)
    {
      max_v_y=abs(vy [i]);
    }
    if(abs(vx [i])>max_v_x)
    {
      max_v_x=abs(vx [i]);
    }
  }
}
max_v_x=abs(max_v_x-abs(average_v_x));
max_v_y=abs(max_v·y-abs(average_v_y));
maxv=max(max_v_x, max_v_y))
```

```
not_use_MCI =
(maxv>(Segm_img>height/32)&&abs(average_v·_x)
<1&&abs(average_v_y)<1)
```

If the value of the variable not_use_MCI is positive, then the pixel-by-pixel interpolation described above is applied. Otherwise, interpolation using vectors of movement (motion compensated interpolation) will be applied.

INDUSTRIAL APPLICABILITY

The present invention has applicability to the field of video processing, and more particularly to a method and system for temporal interpolation of video sequences in an electronic processing, transmission or storage medium.

In compliance with the statute, the invention has been described in language more or less specific as to algorythm steps in processing video sequences. It is to be understood, however, that the invention is not limited to the specific means, features or algorythms shown or described, since the means, features and algorythms shown or described comprise preferred ways of putting the invention into effect.

Additionally, while this invention is described in terms of being used for temporal interpolation of video sequences, it will be readily apparent to those skilled in the art that the invention can be adapted to other uses for other forms of digital electronic signal processing as well, and therefore the invention should not be construed as being limited to processing video sequences. The invention is, therefore, claimed in any of its forms or modifications within the legitimate and valid scope of the appended claims, appropriately interpreted in accordance with the doctrine of equivalents.

What is claimed is:

1. A method for temporal interpolation of video frames within a source video sequence having a plurality of video frames sequentially arranged to form an image, each video frame containing image information data arranged within a video image border, said method comprising the steps of:

reading two adjacent video frames of said source video sequence;

detecting and removing video frame defects;

broadening a video frame beyond its original border, whereby interpolation of a new video frame is enabled;

splitting said video frame into a plurality of blocks;

determining a displacement vector for each block;

providing a means of automatic adjustment of system parameters for a given source video sequence;

providing a means of data storage, whereby electronic video frame information and operational information is stored and retrieved;

providing a means of motion estimation between said video frames;

providing a means of detection of scene changes within said source video sequence;

selecting among at least one type of interpolation means based on said motion estimation;

interpolating and inserting at least one new video frame into said source video sequence;

providing a means of evaluating the quality of a new video sequence following interpolation; and reiterating the steps of motion estimation and detection of scene changes until satisfactory quality is achieved.

2. The method of claim 1 further comprising the step of determining true motion vectors that precisely correspond to motion taking place in said source video sequence.

3. The method of claim 1 further comprising the step of forming intermediate video frames, whereby breaks caused by overlapping of said video frame blocks is eliminated.

4. The method of claim 1 further comprising the step of extrapolating and searching beyond said video frame borders.

5. The method of claim 1, whereby insertion of a plurality of video frames between two adjacent video frames is enabled.

6. The method of claim 1, wherein said video sequence is a restored video sequence following compression by a coding method.

7. The method of claim 1, wherein said video sequence is in any video format (e.g., SIF, QCIF, R601).

8. The method of claim 1, whereby processing of said video sequence is performed in real time.

9. The method of claim 1, whereby the step of quality evaluation of said new video frame interpolation is based on evaluation of displacement vector size for given video frame blocks that exceeds an established error threshold.

10. The method of claim 1 further comprising the step of providing a means for automatic adjustment of video processing parameters to accommodate the character of motion in each source video sequence, whereby no preliminary adjustment of parameters for a particular video sequence is required.

11. The method of claim 1 whereby the steps are carried out by computer software.

12. The method of claim 1 whereby the steps are carried out by hardware.

13. The method of claim 1 whereby the steps are carried out by any combination of software and hardware.

* * * * *